(12) United States Patent
Becker

(10) Patent No.: US 7,316,112 B2
(45) Date of Patent: *Jan. 8, 2008

(54) METHOD OF CREATING FEEDBACK CONTROL IN A CLOSED HYDROSTATIC CIRCUIT AND A CONTROL SYSTEM THEREFORE

(75) Inventor: Aaron T. Becker, Wellsville, KS (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/306,240

(22) Filed: Dec. 20, 2005

(65) Prior Publication Data

US 2006/0196180 A1 Sep. 7, 2006

Related U.S. Application Data

(63) Continuation of application No. 10/758,470, filed on Jan. 15, 2004, now Pat. No. 7,036,309.

(51) Int. Cl.
*F16D 31/02* (2006.01)
(52) U.S. Cl. .................................... 60/443
(58) Field of Classification Search ............ 91/375 R, 91/376 R; 60/443
See application file for complete search history.

(56) References Cited

U.S. PATENT DOCUMENTS

| | | | |
|---|---|---|---|
| 2,230,361 A | 2/1941 | Morin et al. |
| 3,332,323 A | 7/1967 | Roeske |
| 4,037,620 A | 7/1977 | Johnson |
| 4,125,058 A | 11/1978 | Forster |
| 4,558,720 A | 12/1985 | Larson et al. |
| 4,694,849 A | 9/1987 | Rampen |
| 4,804,016 A | 2/1989 | Novacek et al. |
| 5,129,424 A | 7/1992 | Stephenson et al. |
| 5,186,212 A | 2/1993 | Stephenson et al. |
| 5,620,026 A | 4/1997 | Stephenson et al. |
| 5,645,107 A | 7/1997 | Kobayashi et al. |
| 5,819,532 A | 10/1998 | Wang et al. |

*Primary Examiner*—F. Daniel Lopez

(57) ABSTRACT

An improved rotary spool control system for a closed hydrostatic circuit and method to use the same. The control spool utilizes metering of the spool notches and specifically the metering of the servo drain notch wherein the drain notch is of irregular cross sectional shape. Because of the metering and irregular cross sectional shape, this spool is able to provide an aggressive response while still having smooth linear control. The method of creating the feedback control includes displacing pressurized fluid through the hydrostatic circuit rotating the control spool to create an error signal removing the error signal with a control sleeve and metering the servo piston drain with the irregularly shaped metering porting notch.

6 Claims, 9 Drawing Sheets

METHOD OF CREATING FEEDBACK CONTROL IN A CLOSED HYDROSTATIC CIRCUIT AND A CONTROL SYSTEM THEREFORE

This application is a continuation of application Ser. No. 10/758,470 filed Jan. 15, 2004 now U.S. Pat. No. 7,036,309.

BACKGROUND OF THE INVENTION

This invention relates to a rotary control spool for controlling a closed hydrostatic circuit. Currently there are two types of rotary control spools. A first that provides a linear response to a control input but results in such an aggressive response that it is required to utilize a small bleed orifice connecting the system ports in the hydrostatic pump to dampen the apparent response. The use of this small orifice carries with it a unique set of problems such as excess heat and poor efficiency. A second type of spool is one that utilizes metering of its ports. By metering, the spool allows for a smooth or "feathering" operation. Though this provides a softer control response and eliminates the need for the bleed orifice, there are certain applications wherein this metered control spool does not offer adequate response to the operator input. Therefore there is a problem in the art in that it is desired that an operator have a rotary control spool that allows for an aggressive response yet is still smooth enough so that a bleed orifice does not have to be utilized.

Therefore, it is a primary object of the present invention to provide a rotary control spool for an axial piston servo pump control that improves upon the state of the art.

Another object of the present invention is to provide a rotary control spool that meters its drain port to allow for a smooth operation.

Yet another object of the present invention is to provide a rotary control spool that utilizes a notch that tapers inwardly to a point that increases the spool porting area in order to provide an aggressive response.

Another object of the present invention is to use the combination of the metered drain port with the notch that tapers inwardly to a point that increases flow area in order to provide a rotary control spool that allows for an aggressive response and yet provides a smooth operation.

These and other objects, features, or advantages of the present invention will become apparent from the specification and claims.

BRIEF SUMMARY OF THE INVENTION

The present invention is a high gain rotary control spool for an axial piston servo pump control and a method of creating feedback control using the same. The control spool is in a closed hydrostatic circuit and is fluidly connected to a servo controlled axial piston pump. The control spool has a drain orifice defined by a variable metering porting notch that tapers inwardly to a point opened to the servo piston drain. By metering the drain and by having a porting notch that tapers inwardly to a point that increases the flow area of the spool, the spool is able to provide an aggressive response and smooth operation. The method of creating the feedback control with this unit involves displacing fluid within the servo control circuit, rotating the control spool to create an error signal, removing that the error signal with a control sleeve, and simultaneously metering the servo piston drain with the metering porting notch that tapers inwardly to a point.

DETAILED DESCRIPTION OF THE INVENTION

Figure 1:
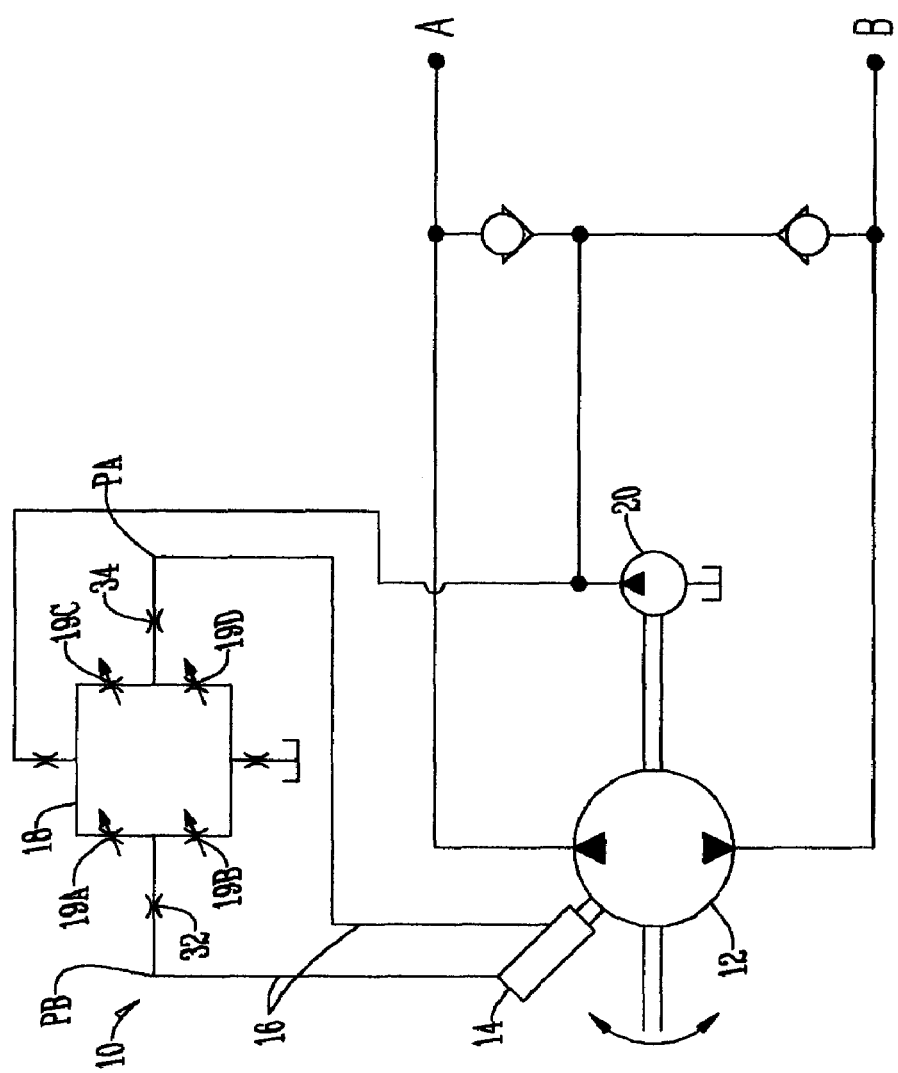
FIG. 1 is a schematic diagram of the hydrostatic circuit in which the spool of the present invention resides.

FIG. 1 shows a schematic of the closed hydrostatic circuit 10 of this invention. Closed hydrostatic circuit 10 has a servo controlled axial piston hydrostatic pump 12 with a servo system 14 that has conduits 16 that fluidly connect the servo system 14 to a rotary control spool valve 18. Rotary control spool valve 18 has variable orifices 19A, 19B, 19C, and 19D and is operably connected to both a charge pump 20 and servo system 14. Charge pump 20 provides charge pressure to the circuit 10.

Figure 2:
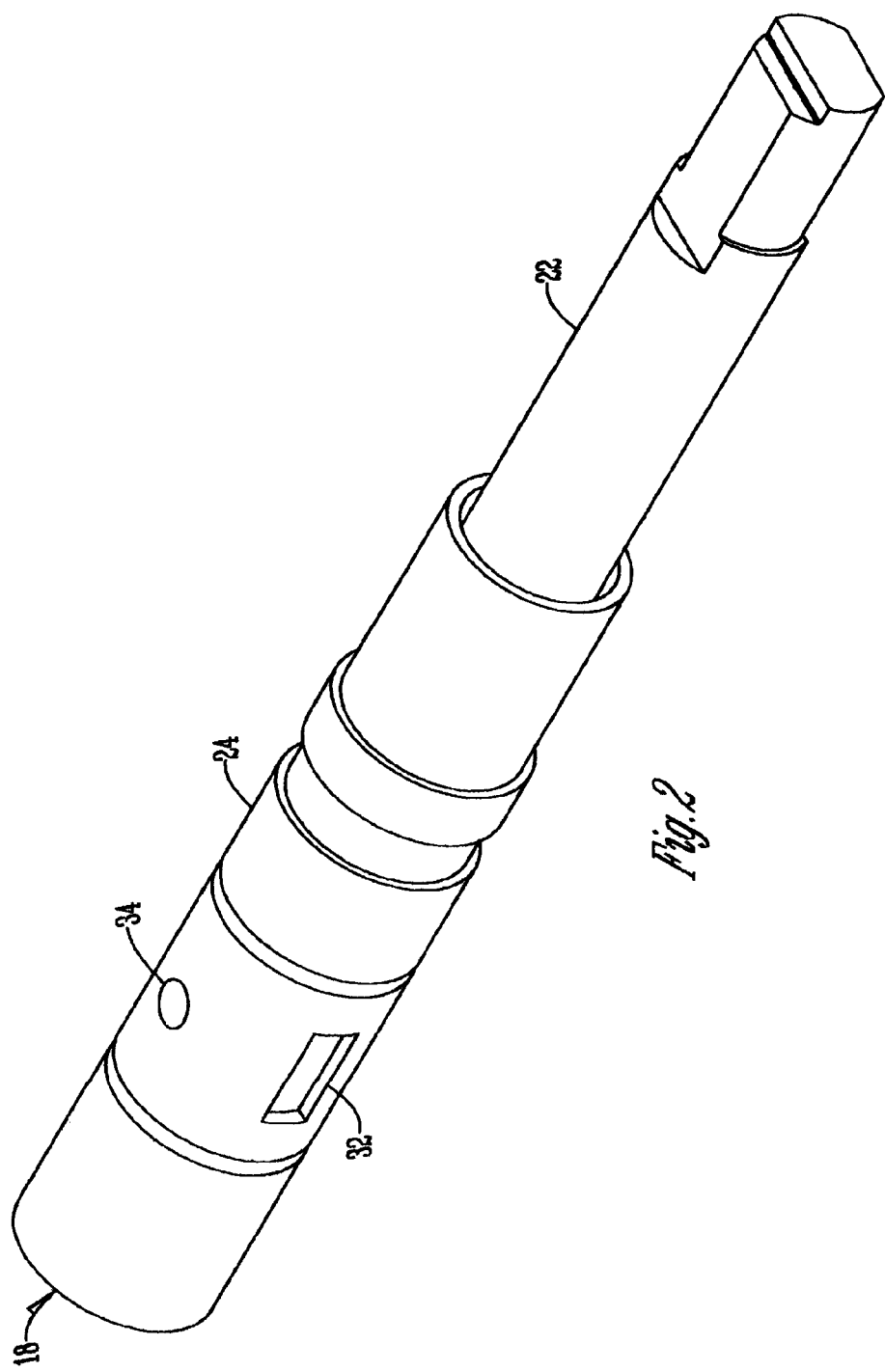
FIG. 2 is a perspective view of the spool within the spool sleeve.
Figure 3:
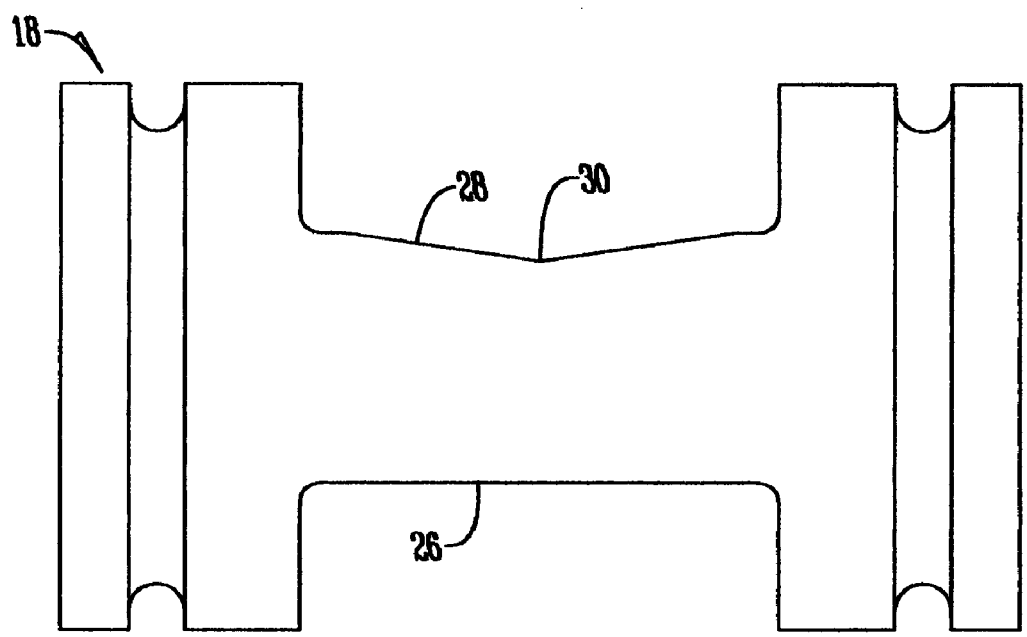
FIG. 3 is a plan view of the spool notches of the present invention.
Figure 4:
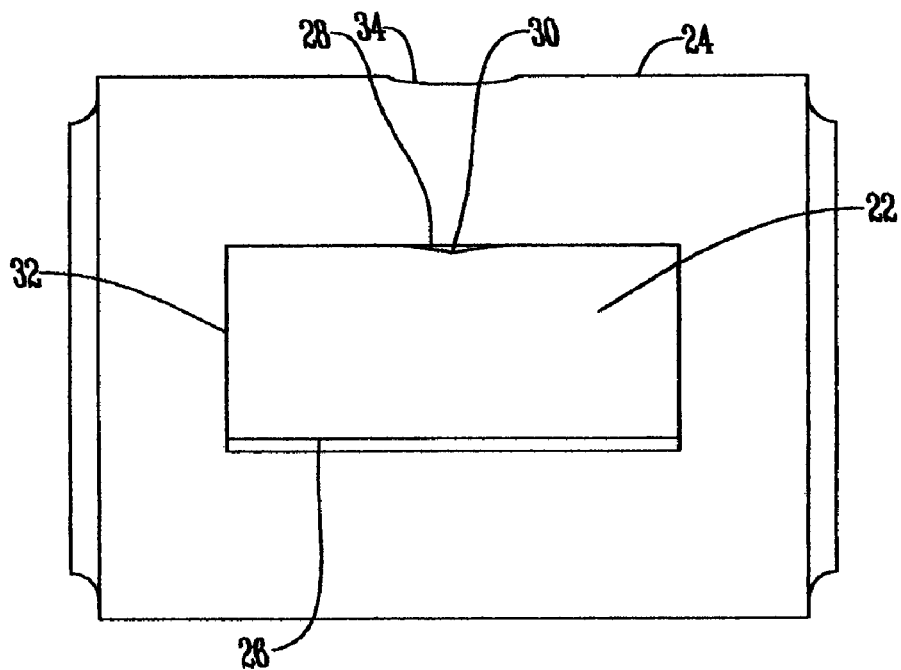
FIG. 4 is a plane view of the orifice in the sleeve that allows for the servo pressure to be introduced via the spool.

FIG. 2 shows the rotary control spool valve 18 of the present invention. The valve 18 has a spool 22 that is an elongated cylinder rod that is specifically designed to fit within the elongated sleeve 24. As seen in FIG. 3, control spool 22 is designed to have a plurality of notches. The spool 18 has a first notch 26 that acts as an inlet servo fill notch that has a rectangular cross sectional area. The spool 18 also has a second notch 28 that functions as a servo drain and has a cross sectional area that tapers inwardly to a point. Instead of having a rectangular cross section, the second notch servo drain 28 tapers inwardly to a point 30. This is unlike prior art cross sections that commonly use a rectangular shaped cross sections for the servo drain 28. Therefore, servo drain 28 is shaped to allow for a greater flow area. The sleeve 24 has a servo pressure inlet 32 and a servo drain outlet 34 that are associated with the first and second notches 26, 28 respectfully.

In operation, the closed hydrostatic circuit 10 has fluid displaced through it reaching the rotary control 18. When fluid flows to the rotary control 18 the inlet and outlet flow is metered into and out of the cavities of servo piston 12. This balance of flows and resulting pressures results in a pressure control input to the pump 12 which causes the pump 12 to react due to the difference in resulting forces between the servo sides. As the control spool 22 rotates relative to control sleeve 24 a hydraulic pressure error signal is generated, causing the servo system 18 to respond based on the control input. As the system 18 responds, the control (feedback) sleeve 24 responds accordingly and removes the hydraulic pressure error signal. The control characteristics or response time is dictated by the characteristics of the inlet and outlet porting notches 26, and 28, in the control spool 22 and sleeve 24. These notches 26, and 28 and the error between the control spool 22 and sleeve 24 generate a two path, variable orifice flow hydraulic circuit.

It should be appreciated that the disclosed innovation relates to applying a control spool 22 that normally has its inlet and drain notches 26 and 28 open to the servo piston cavities creating a normally pressurized servo while metering the servo drain 28. By metering the servo drain 28 the control 18 makes management of the flow area relationships simpler and creates a smoother operating control. Preferably the improved spool also exhibits a restricting flow area of about 0.55 mm$^2$ compared to a metered spool that exhibits a flow area of only about 0.23 mm$^2$ at the same threshold. This difference in flow area will be directly related to the response-time of the unit allowing the improved spool to respond between two and three times faster than the metered spool. By using a drain notch 28 that tapers inwardly to a point as a metering notch allows for nonlinear response of control flow and subsequently servo pressure response. Thus, by combining the metered drain with the implementation of the servo drain notch 28 that tapers inwardly to a point, the control 18 can create an aggressive response control while maintaining smooth control of the unit.

The improved control response is obviated in FIGS. 5, 5A, 6, 6A, 7, and 7A that show graphically how using the metered drain and spool notch that tapers inwardly to a point compares to the standard spool and a metered spool.

Figure 5:
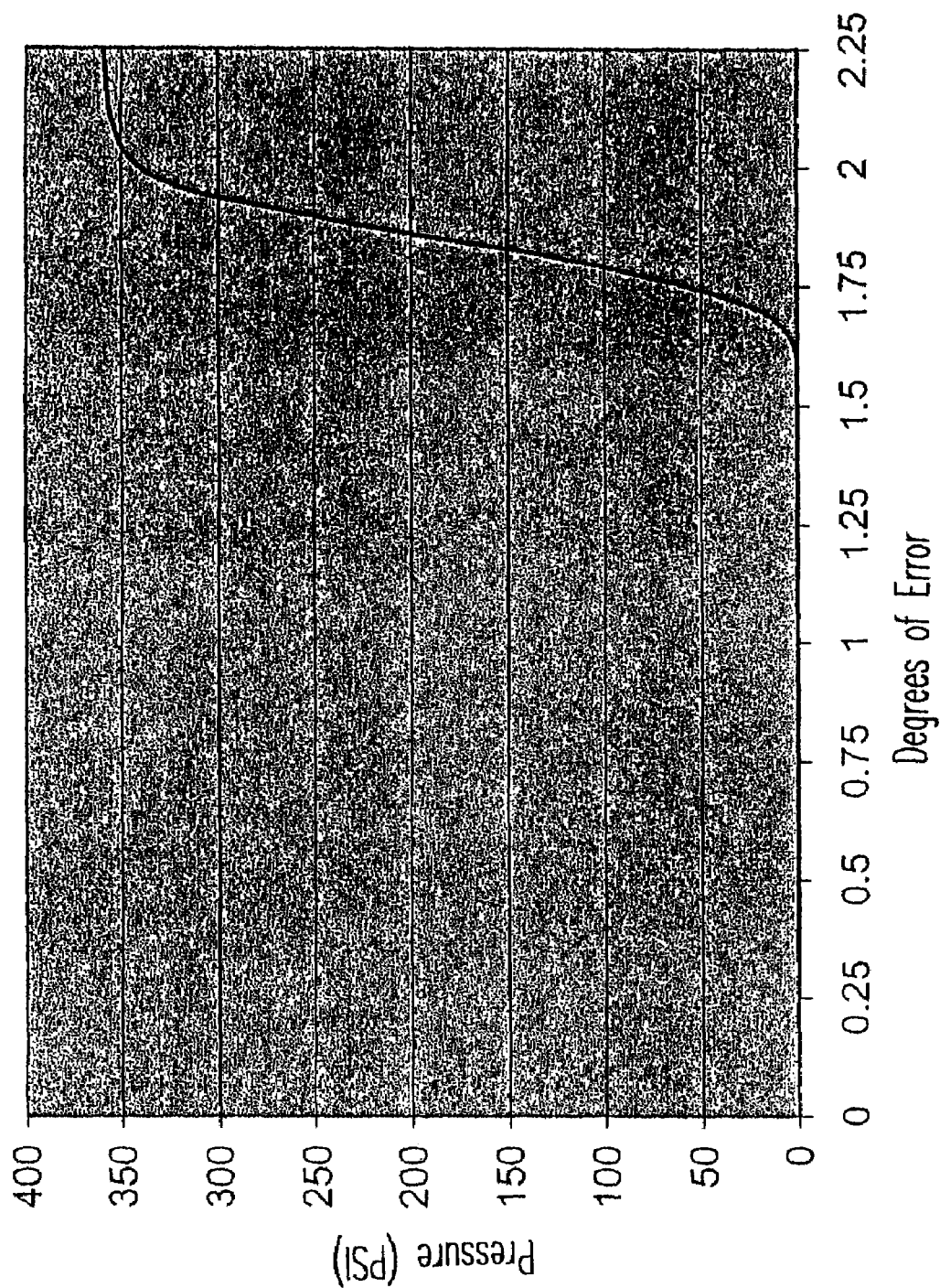
FIG. 5 is a graph representing the servo and flow characteristics of a standard rotary control spool.
Figure 5A:
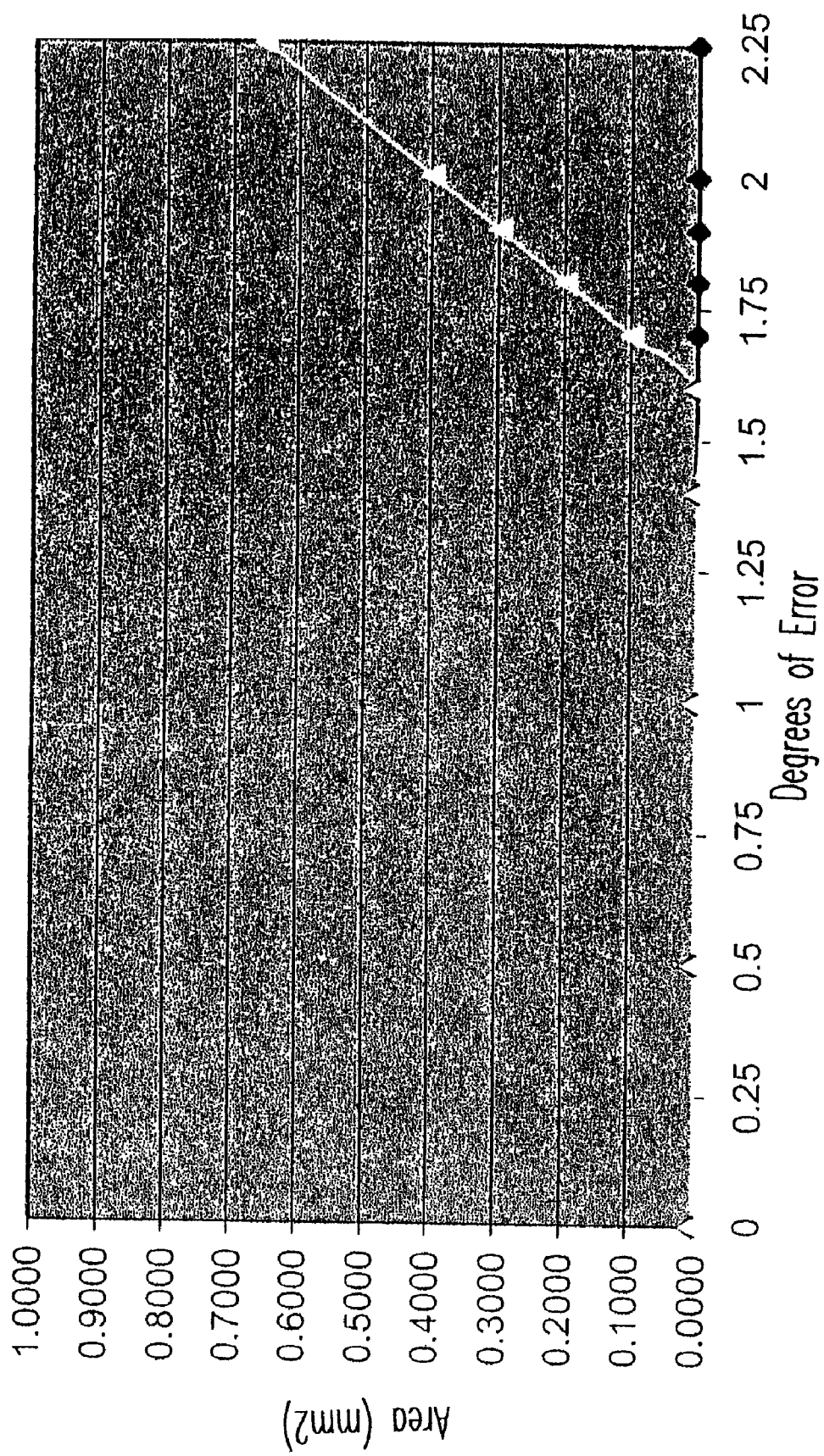
FIG. 5A is a graph representing the servo and flow characteristics of a standard rotary control spool.

Each of the FIGS. 5-7A provides two graph a piece (e.g. 5 and 5A), the first graph has a Y axis representing pressure measured in psi and an X axis representing degrees of error, while the second chart of each of the figures has a Y axis representing area measured in squared millimeters and an X axis, again representing degrees of error. As seen in FIG. 5 the standard spool exhibits a servo delta curve that appears as a "step change" in servo pressure as the control porting opens and closes, thus as seen in FIG. 5, the servo pressure quickly goes from 0 to over 350 psi when the degrees of error goes between 1.5 and 2.25. FIG. 5A shows that over the same degrees of error the area of orifice 19C (Ai) increases linearly while orifice 19A (Bi) does not open. Though the standard spool shows the aggressive response desired (over 350 psi of pressure) the response occurs over a very short range of degrees of error and therefore does not operate smoothly as desired.

Figure 6:
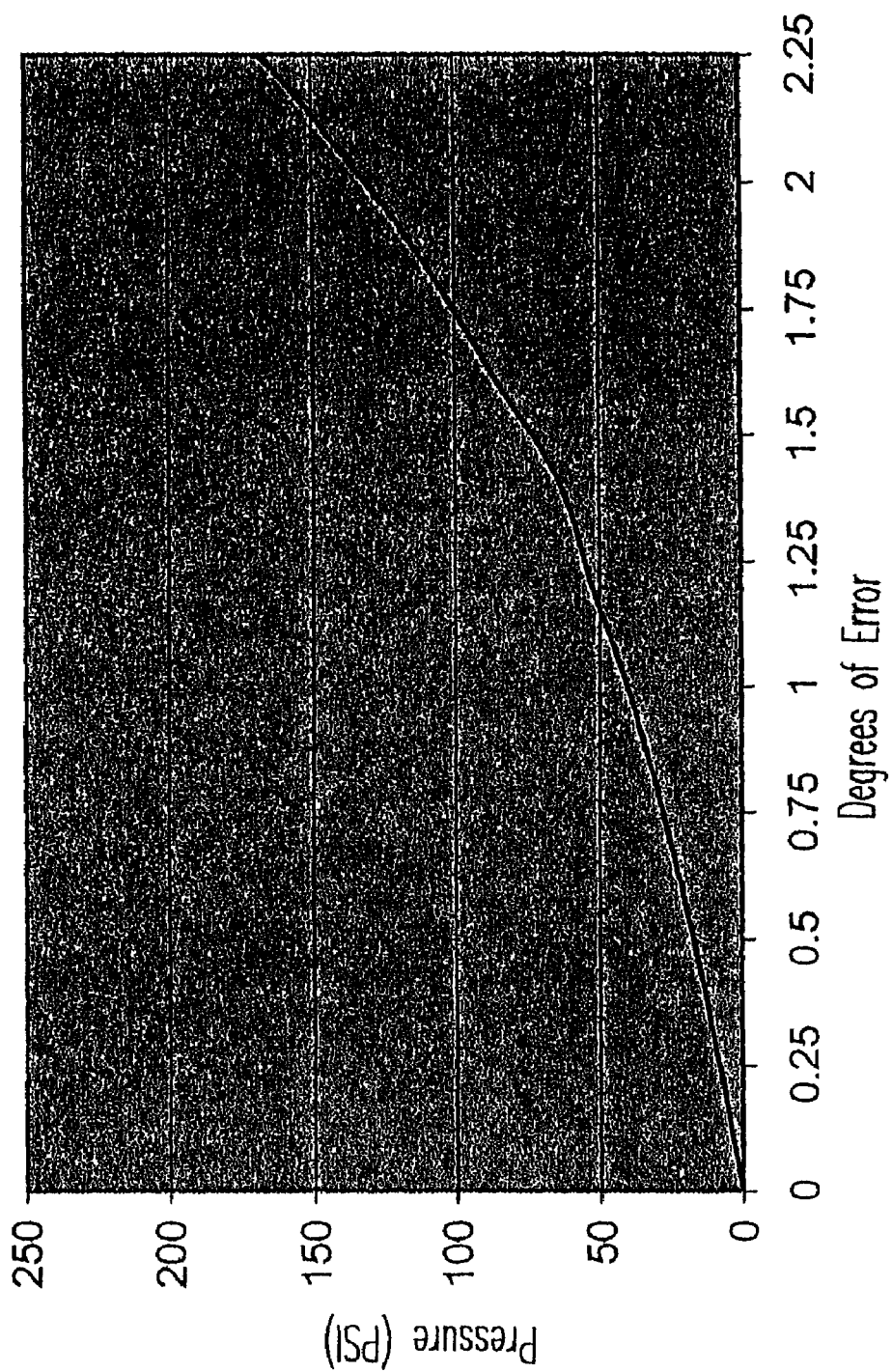
FIG. 6 is a graph representing the servo and flow characteristics of a metered rotary control spool.
Figure 6A:
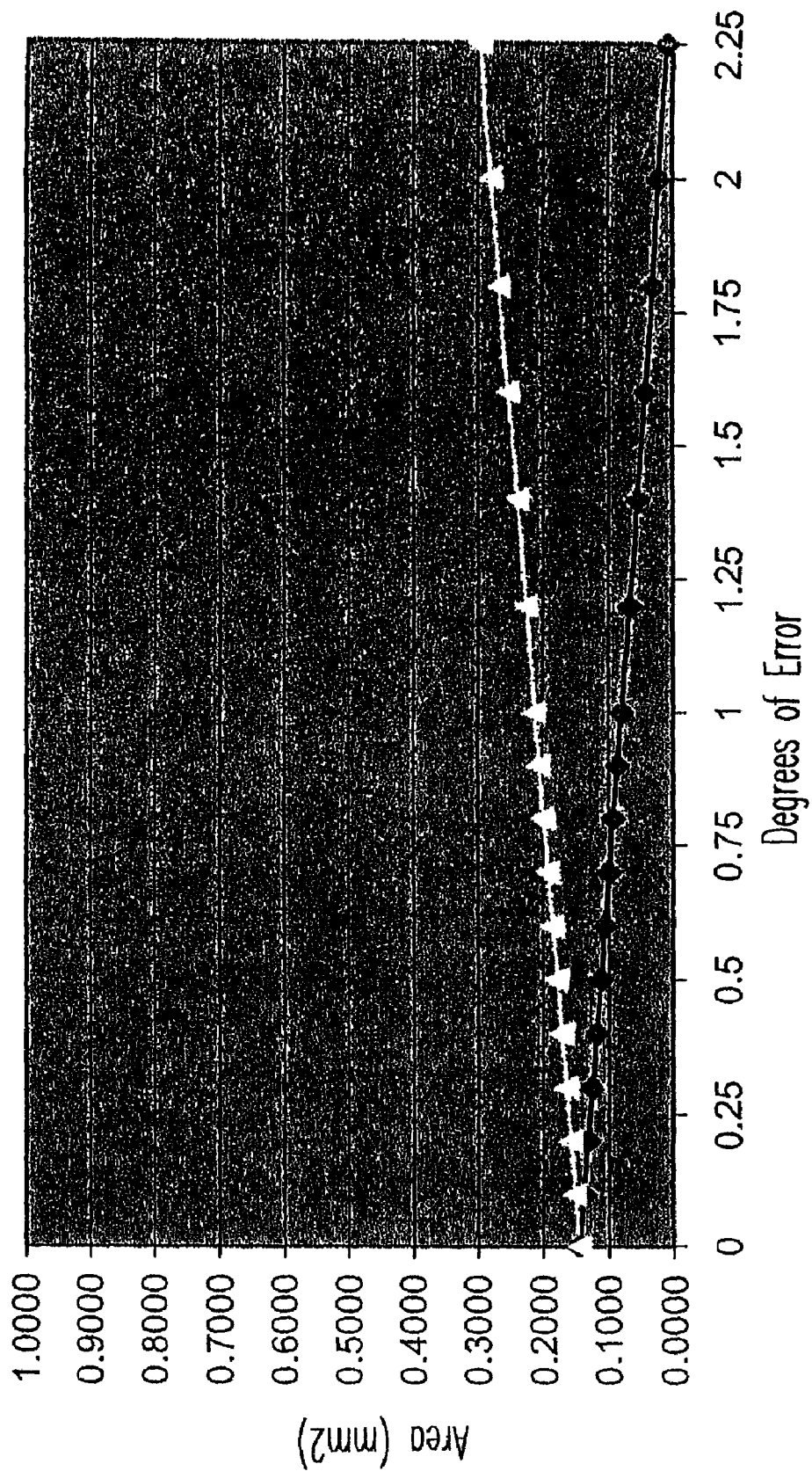
FIG. 6A is a graph representing the servo and flow characteristics of a metered rotary control spool.

FIGS. 6 and 6A show a control spool that is metered. By metering the spool over the same degrees of errors range as the standard spool (0-2.25) the operation is much more smooth as can be seen from the gradual pressure increase over the entire range. However, the pressure exerted by this system does not even reach 200 psi and therefore does not show an aggressive response as desired in many applications.

Figure 7:
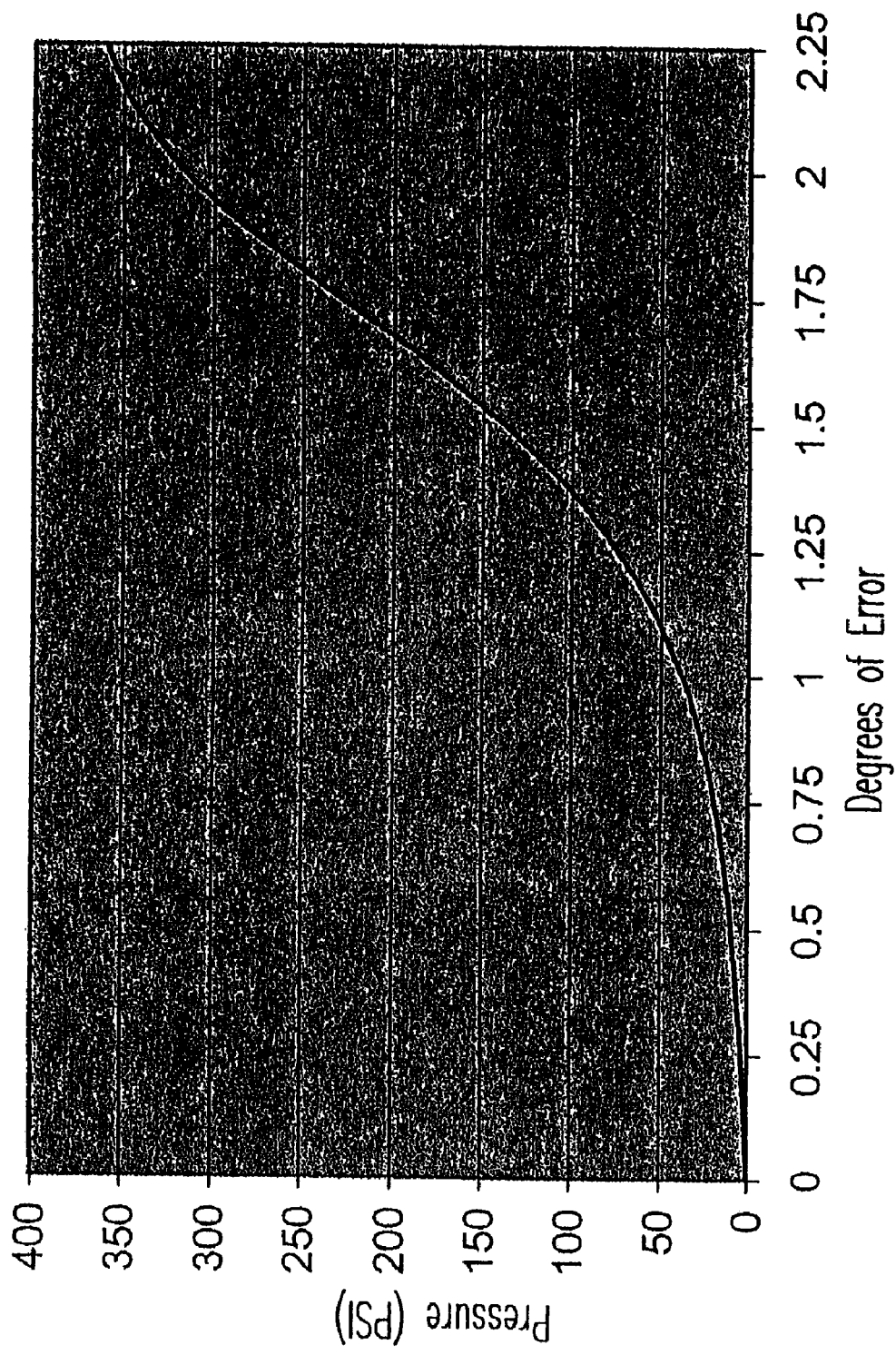
FIG. 7 is a graph representing the servo and flow characteristics of the improved control spool of this invention.
Figure 7A:
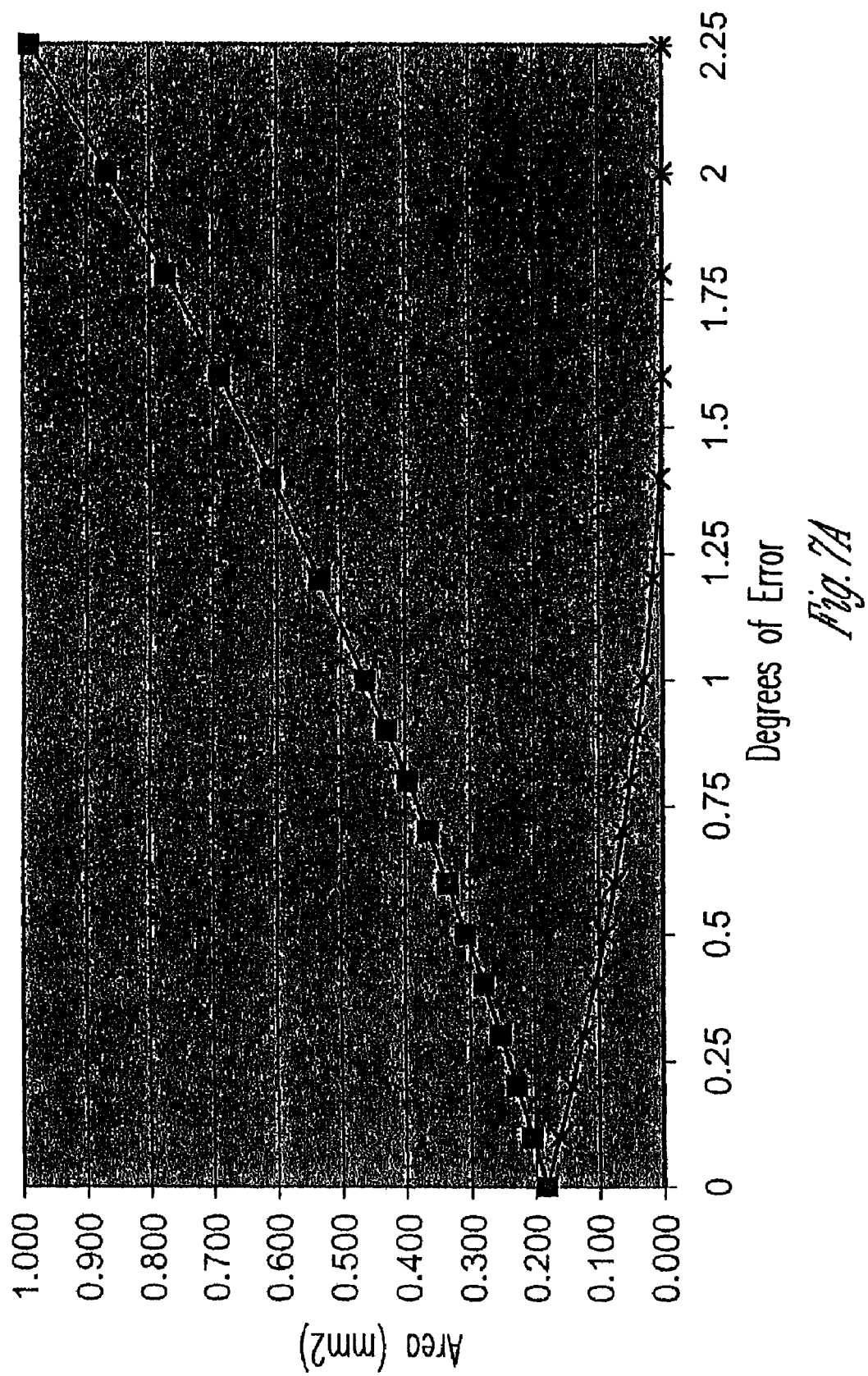
FIG. 7A is a graph representing the servo and flow characteristics of the improved control spool of this invention.

FIGS. 7 and 7A show the response of the present invention with Ao and Bo representing the drain orifices 19D and 19B. By metering the increased drain area the response of the spool reaches over 350 psi representing the desired aggressive response desired, while doing so gradually over the entire range of degrees of errors (0-2.25) to provide the smooth operation also desired. Consequently, the control of the present invention improves upon the state of the art and meets all of the objectives.

It will be appreciated by those skilled in the art that other various modifications could be made to the device without the parting from the spirit in scope of this invention. All such modifications and changes fall within the scope of the claims and are intended to be covered thereby.

What is claimed is:

1. A control system for a closed hydrostatic circuit comprising:
   a servo controlled axial piston hydrostatic pump having a servo drain;
   an elongated spool having a servo fill metering port and a servo drain metering port that tapers inwardly to a point fluidly connected to the servo drain; and
   a sleeve surrounding the spool such that the spool is partially disposed within the sleeve, wherein the sleeve is adapted to respond to an error signal generated by the spool.

2. A closed hydrostatic circuit comprising:
   an axial piston hydrostatic pump having a servo system;
   a rotary control spool valve having a servo fill port and a servo drain metering port that tapers inwardly to a point fluidly connected to the servo system; and
   a charge pump operably connected to the rotary control spool to provide charge pressure to the circuit.

3. The closed hydrostatic circuit of claim 2 wherein the servo fill port is metered.

4. The closed hydrostatic circuit of claim 2 wherein the rotary control spool valve is comprised of an elongated spool that is adapted to be partially disposed within a spool sleeve.

5. The closed hydrostatic circuit of claim 4 wherein rotating the control spool within the spool sleeve creates an error signal.

6. The closed hydrostatic circuit of claim 2 wherein only the drain port is metered with the port that tapers inwardly to a point.

* * * * *